United States Patent
Li

(10) Patent No.: US 7,323,110 B1
(45) Date of Patent: Jan. 29, 2008

(54) WASTEWATER TREATMENT PROCESS USING CORE-SHELL PARTICLES

(75) Inventor: Pei Li, Kowloon (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 0 days.

(21) Appl. No.: 11/636,542

(22) Filed: Dec. 11, 2006

(51) Int. Cl.
*B01D 37/00* (2006.01)

(52) U.S. Cl. .................. 210/767; 210/787; 210/791

(58) Field of Classification Search ............... 210/767, 210/787, 791
See application file for complete search history.

(56) References Cited

U.S. PATENT DOCUMENTS 6,573,313 B2 * 6/2003 Li et al. ............... 523/201

OTHER PUBLICATIONS

P. Erol Duru et al.—Adsorption of Heavy-Metal Ions on Poly(ethylene imine)-Immobilized Poly(methyl methacrylate) Microspheres, 2001.

Kryvoruchko et al.—Ultrafiltration removal of U(VI) from contaminated water—Desalination 162 (2004) 229-236.

R.Molinari et al.—Comparison of polyethylenimine, polyacrylic acid and poly(dimethylamine-co-epichlorohydrin-co-ethylenediamine in $Cu^{2+}$ removal from wastewaters by polymer-assisted ultrafiltration—Desalination 162 (2004) 217-228.

M.Ghoul et al.—Uptake of heavy metals from synthetic aqueous solutions using modified PEI-silica gels—Water Research 37 (2003) 729-734.

Niramol Sakkayawong et al.—Adsorptioin of synthetic reative dye wastewater by dhitosan Journal of Colloid and Interface Science 286 (2005) 36-42.

* cited by examiner

*Primary Examiner*—Chester T. Barry
(74) *Attorney, Agent, or Firm*—Robert M. DeWitty

(57) ABSTRACT

The present invention relates to a method of treating inorganic and organic compounds in wastewater, such as leachate. The treatment method involves the use of a amphiphilic particles that consist of hydrophobic cores and amine-containing polymer shells. The method of making the particles and their structures are such that the particles have diameters in the range of 100 to 500 nm and they may be used multiples of times more in treating wastewater, through the process of regenerating the particles.

17 Claims, 8 Drawing Sheets

WASTEWATER TREATMENT PROCESS USING CORE-SHELL PARTICLES

BACKGROUND

Large amounts of municipal solid waste (MSW) are produced daily in various world cities as populations continue to grow. To address growing MSW production, MSW consisting of domestic, commercial, industrial wastes and construction and demolition waste are disposed to landfills daily. After landfilling, the solid waste undergoes various physico-chemical and biological changes. Consequently, degradation of the organic matter of the wastes combine with rainwater. The dissolution of highly contaminated wastewater generates "leachate". Leachate usually contains high concentrations of ammoniacal-nitrogen ($NH_3$—N), non-biodegradable organic compounds (as indicated by a high value of COD concentration), and heavy metals. Because leachate generated from landfills may find its way into the underlying groundwater, resulting in contamination of ground water, leachate leakage from landfill sites cause a long-term hazards to the surrounding environment. $NH_3$—N, present in leachate, has been identified as one of the major toxicants to aquatic organisms.

Biological treatment is commonly used in landfill treatment because of its reliability and simplicity. Its removal performance of BOD and $NH_3$—N in leachate containing high concentration of BOD is reasonable and also meets stringent discharge standards. However, biological treatment preferably removes biodegradable compounds but it is not effective for non-biodegrable compounds. Thus, COD level of leachate after biological treatment still cannot meet the strict environmental legislation discharge standards. As a result, removal of organic compounds becomes more and more difficult when leachate contains higher concentrations of non-biodegradable compounds. Another major drawback of using biologically aerobic reactors is the need of a large installation space and high operational costs (about US$13/$m^3$ of treated effluent). To address this problem, new cost-effective and efficient treatment methods for the removal of non-biodegradable compounds in landfill leachate are necessary.

It is an object of the present system to overcome the disadvantages and problems in the prior art.

DESCRIPTION

The present invention proposes a method of treating wastewater for both inorganic and organic compounds. Through the present system, it is shown that the nanoparticle has undoubtedly emerged as one of the most economically and ecologically promising technique to remove refractory organic compounds such as 4-CP from landfill wastewater, for example leachate. The present invention shows the first use of environmentally friendly nanoparticles as one of the alternative low-cost absorbents to remove recalcitrant compounds from landfill wastewater. In comparison to the prior art, which have focused on the use of low-cost adsorbents made from agricultural waste, natural materials, industrial by-products to remove heavy metal from contaminated wastewater, the present invention employs nanoparticle to treat hazardous wastewater, in particular leachate.

The present invention also proposes a method of treating leachate for inorganic and organic compounds.

The present invention further proposes a method of making particles for use in the method of treating wastewater and treating leachate.

These and other features, aspects, and advantages of the apparatus and methods of the present invention will become better understood from the following description, appended claims, and accompanying drawings where:

Figure 3:
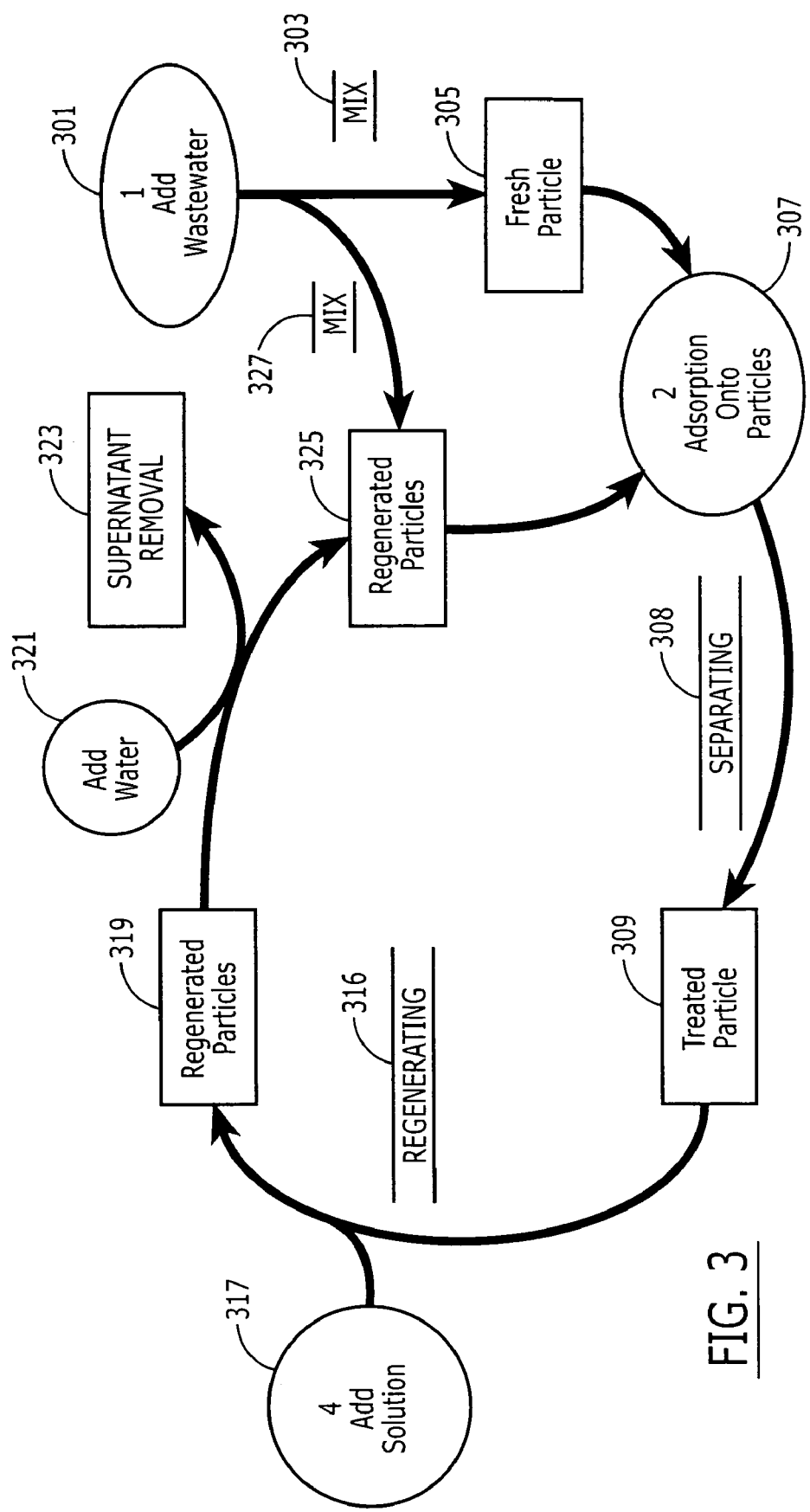

FIG. 3 sets forth the method of the present invention.

Figure 4:
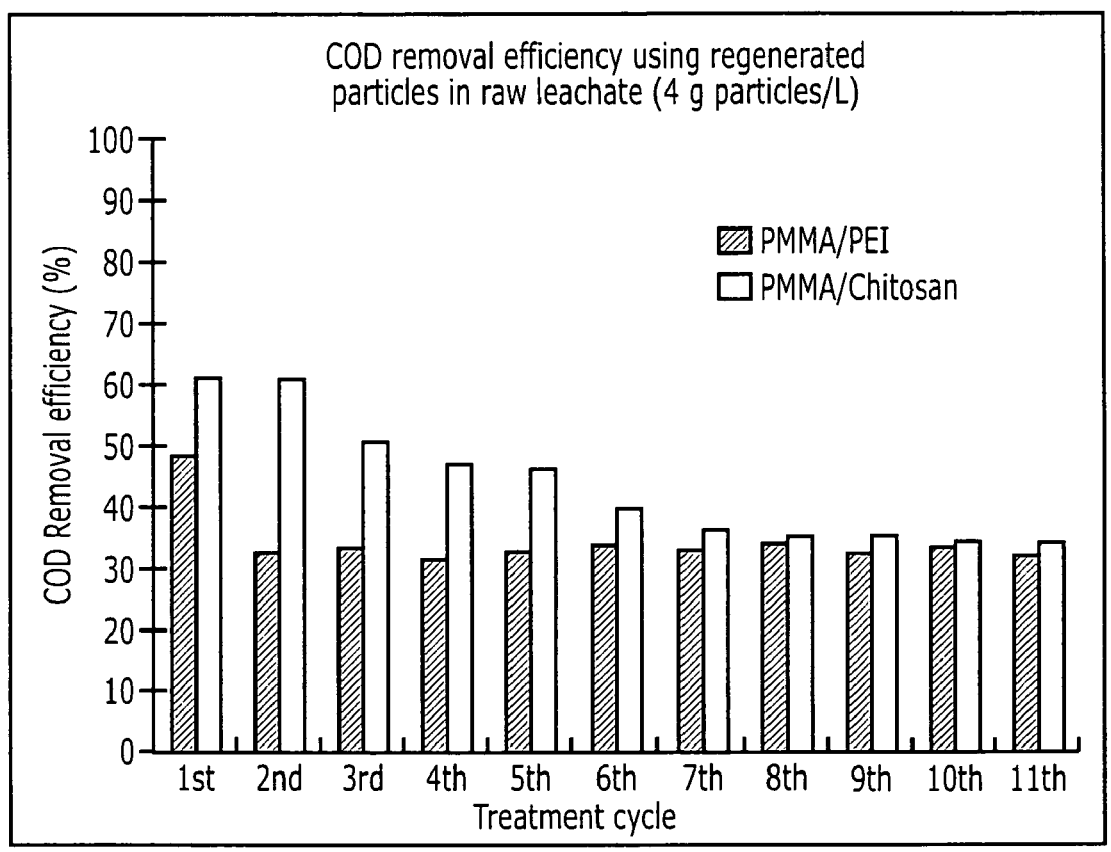

FIG. 4 exhibits the effectiveness of the particles used in accordance with the present system as a COD measurement.

Figure 5:
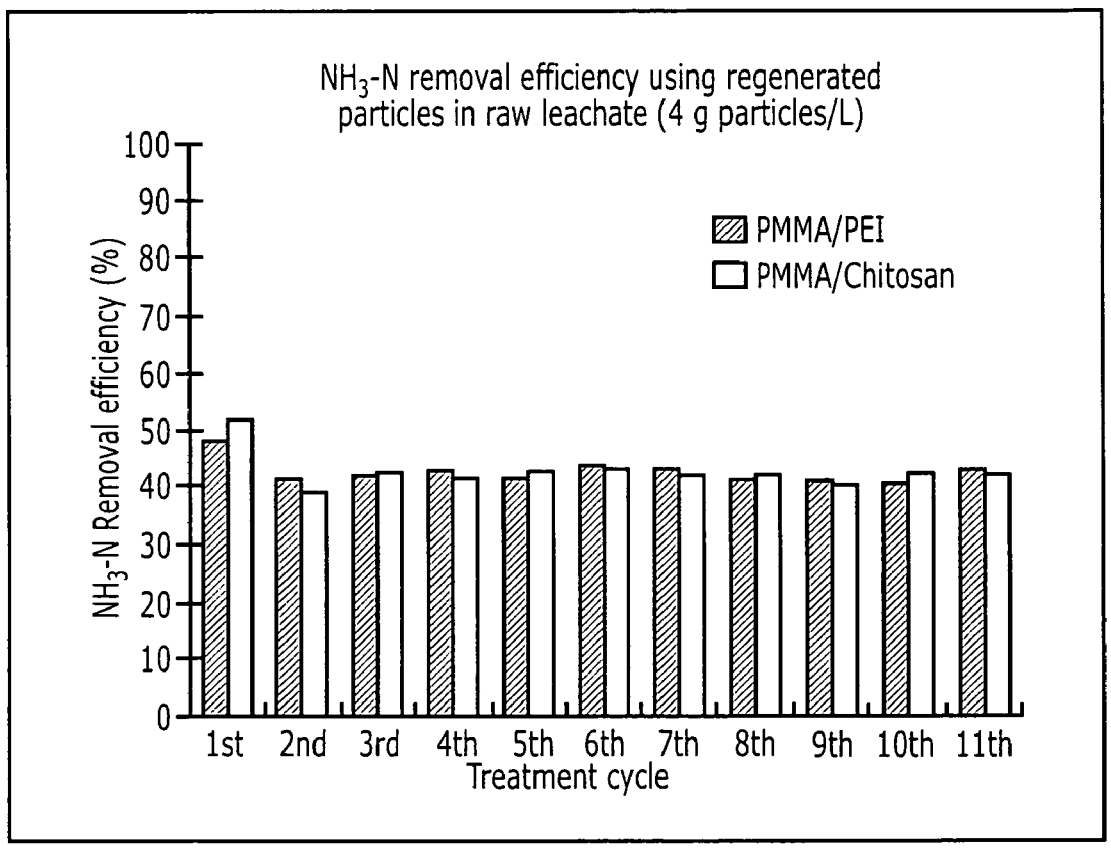

FIG. 5 exhibits the effectiveness of the particles used in accordance with the present system as a $NH_3$—N measurement.

Figure 6:
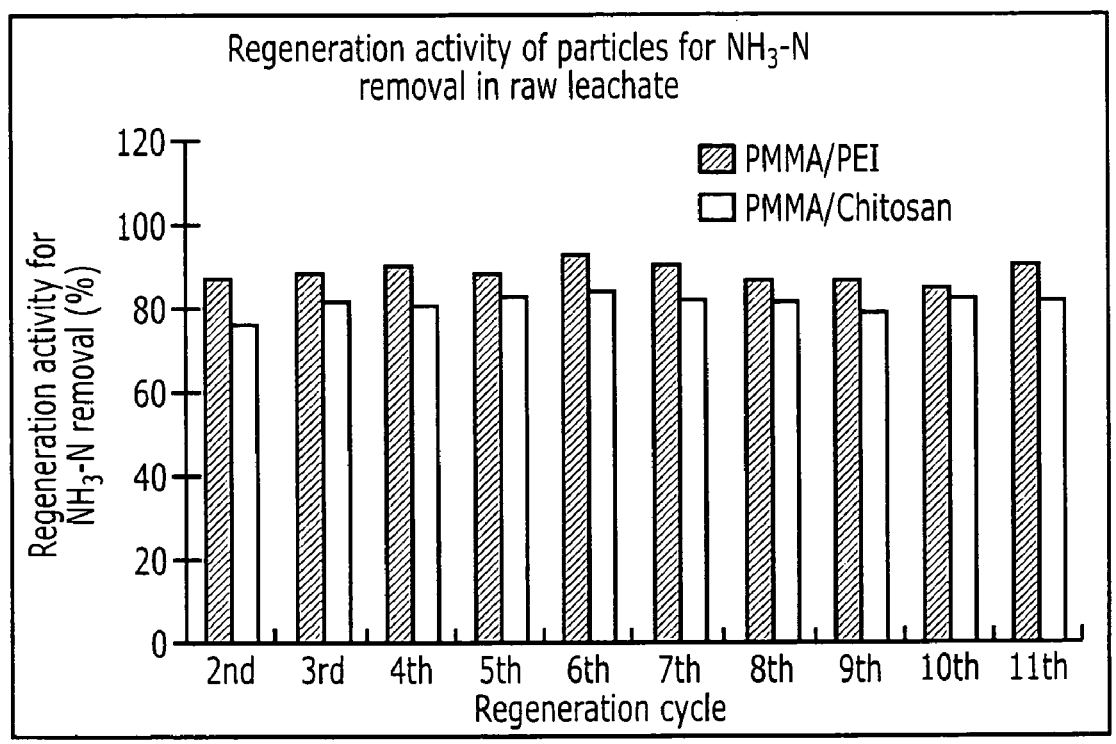
Figure 7:
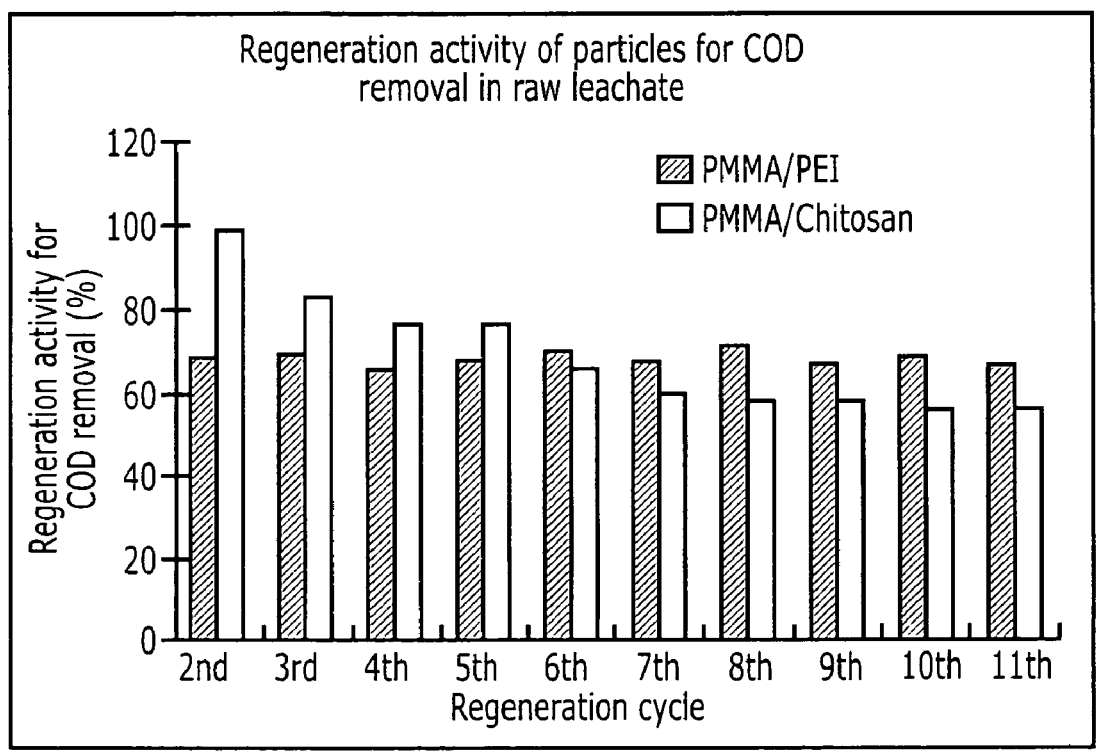
Figure 8:
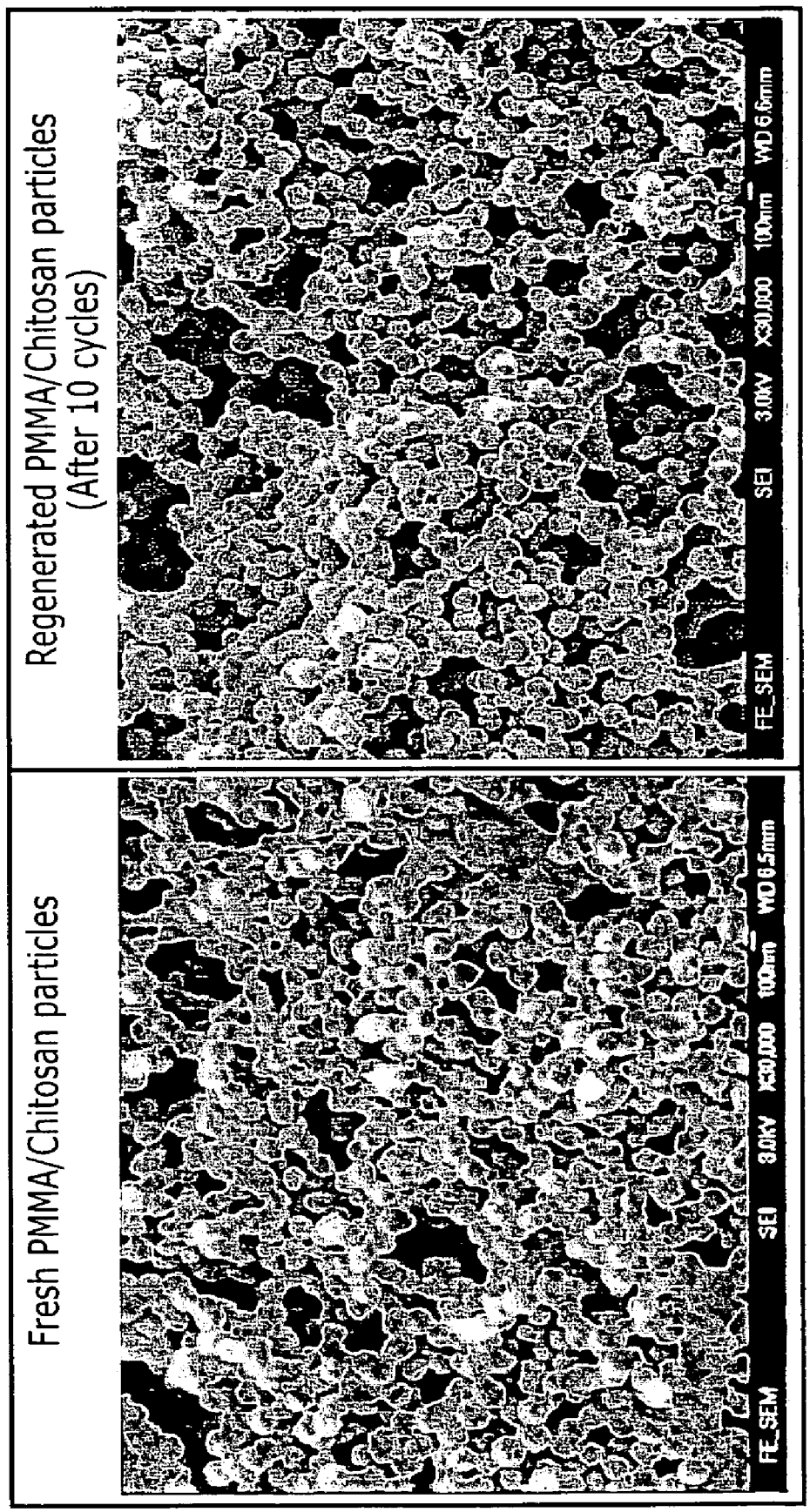

FIG. 6 shows the regeneration efficiency of the particles following treatment of leachate for $NH_3$—N FIG. 7 shows the regeneration efficiency of the articles following treatment of leachate for COD FIG. 8 is an image comparing fresh particles prior to use in the treatment of wastewater and regenerated particles following their use in the treatment method of the present invention.

The following description of certain exemplary embodiment(s) is merely exemplary in nature and is in no way intended to limit the invention, its application, or uses. Throughout this description, the term "COD" refers chemical oxygen demand, which is an indirect measurement of the amount of organic compounds in water.

The term "BOD" refers to biochemical oxygen demand which is an indirect measurement of the concentration of biodegradable organic matter present in a sample of water.

The term "wastewater" refers to water that has been adversely affected in quality by anthropogenic influence, including liquid waste discharged by domestic residences, commercial properties, industry, and agriculture. As detailed below, an example of wastewater is leachate.

The term "raw" refers to physical objects or products that have been untreated, unfinished, unrefined, or unprocessed following their production or development.

Figure 1:
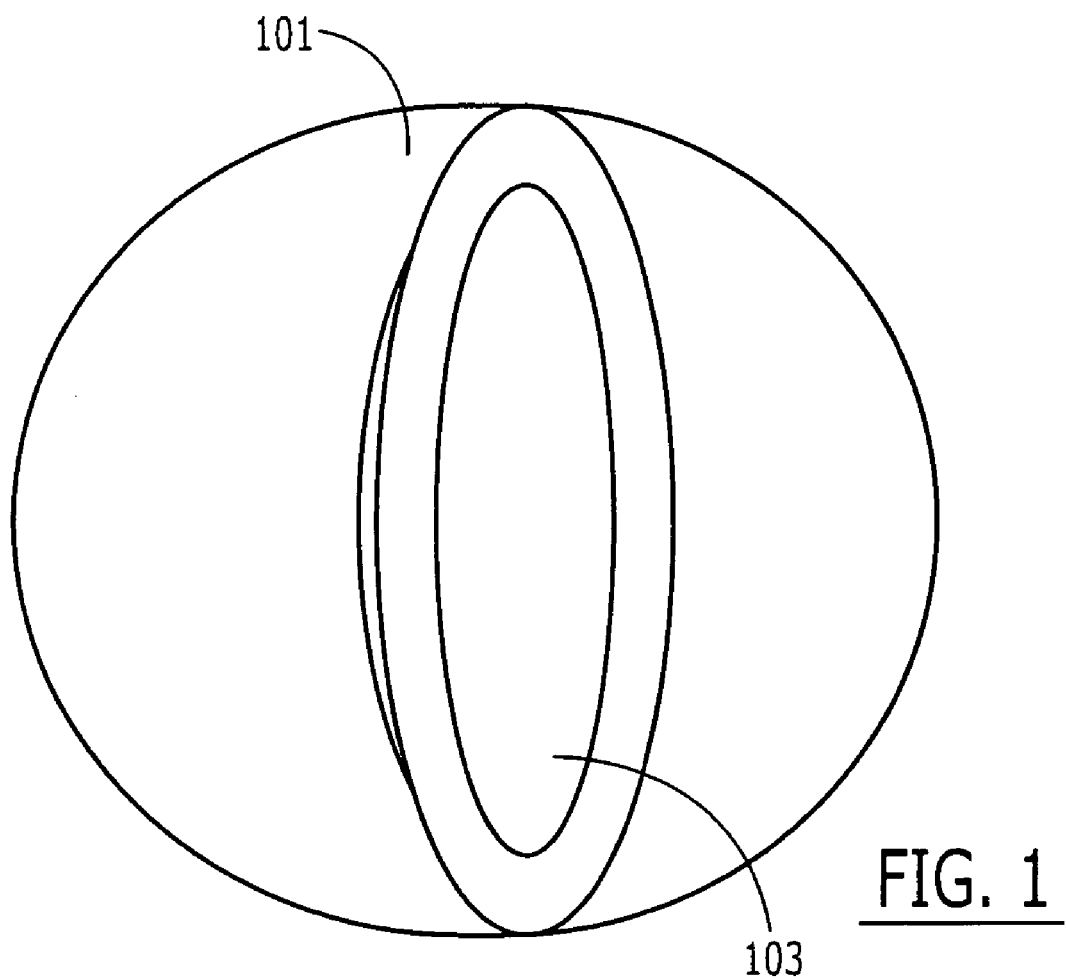
FIG. 1 shows a particle to be used in the method of the present invention.

Now, specifically to FIGS. 1-6,

FIG. 1 is an embodiment of a particle used with the present system, such particle being an amphiphilic core-shell particle. The particle contains a shell 101 and a core 103.

The shell 101 is a hydrophilic, nitrogen containing compound, such as a polymer, that can be natural or synthetic. The nitrogen can be present as an amino group. Primary amine (—$NH_2$), secondary amine (—NRH), and tertiary amine (—$NR_2$) are examples of functional groups for this reaction. Structurally, the amino-containing polymers may be in the form of linear or cyclic aliphatic or aromatic amine. The amino function may be located in the polymer main chain or in the side chains. Functional groups can also include amides including unsubstituted amide (—$CONH_2$), mono-substituted amide (—CONH—R) and disubstituted amide (—CONRR'), which tend to give lower conversion. Biopolymers containing both amino and amide groups and synthetic polymer containing amine groups give high conversion of the monomer and form very stable core-shell particles with narrow size distribution. Examples of the nitrogen-containing compounds include synthetic amino polymers such as polyethyleneimine, N-acetyl sugars such as chitosan, or proteins such as casein, gelatin, bovine serum albumin, and cellulose, etc. In one embodiment, the nitrogen containing compound used in the shell is a amine compound such as ethylenediamine, diethylenetriamine, triethylenetriamine, tetraethylenepentamine, pentaethylenehexamine, polyethyleneimine, or mixtures of one or more of such compounds. In another embodiment, the shell is made of chitosan.

Further examples of the shell include water soluble polymers containing quaternary ammonium groups.

The core 103 is composed of a homopolymer of a hydrophobic vinylic monomer or a mixture of two or more hydrophobic vinylic monomers, and grafted copolymer of the hydrophobic vinylic monomer. The vinylic polymer is prepared using a vinylic monomer. The nature of the monomer can be, for example a vinyl monomer, a diene, an acrylate monomer or an acrylamide monomer. Examples of vinylic monomers include those of formula $R^1R^2C=CH$, where $R^1$ is hydrogen or alky, and where $R^2$ is alkyl, aryl, heteroaryl, halo, cyano, or other suitable hydrophobic group. Groups for $R^1$ can include hydrogen and methyl. Groups for $R^2$ include $C^1$-$C^6$ alkyl; phenyl; monocyclic heteroaryl with 4 to 8 ring atoms, more preferably 5 or 6 ring atoms, and with 1, 2 or 3 ring heteratoms, preferably 1 or 2, more preferably 1 ring atom, selected from nitrogen, oxygen or sulfur; chloro; and cyano. Examples of dienes include those of formula $CH_2=C(R^1)-C(R^2)=CH_2$ where $R^1$ is hydrogen or halogen or alkyl, and where $R^2$ is hydrogen or alkyl, such as $C_1$-$C_6$ alkyl. Groups for $R^1$ include hydrogen, chloride and methyl. Groups for $R^2$ include hydrogen and methyl. Examples of acrylate monomers include those of formula $CH_2=CR^3COOR^4$, where $R^3$ is hydrogen or alky, and where $R^4$ is alkyl or substituted allyl, or other suitable hydrophobic group. Groups for $R^3$ include hydrogen and methyl. Groups for $R^4$ include $C_1$-$C_{16}$, for example $C_1$-$C_{12}$ alkyl which may be straight-chain or branched, and such groups substituted with one or more substituents chosen from unsubstituted amino, monosubstituted amino or disubstituted amino, hydroxy, carboxy, or other usual acrylate substituent. Acrylate monomers can comprise ethyl (meth) acrylate, isopropyl (meth)acrylate, n-butyl (meth)acrylate, and the like. Examples of acrylamide monomers include those of formula $CH2=CR^3COONHR^4$, where $R^3$ and $R^4$ are as defined. Possible types of vinyl monomers are shown in table 1.

TABLE 1

Structures of Various Vinyl Monomers

| Type of Vinyl Monomer | R | R' |
|---|---|---|
| Vinyls<br>$CH_2=\underset{R'}{\overset{R}{C}}$ | —H<br>—$CH_3$<br>—Cl | Alkyl<br>Phenyl<br>Pyridine<br>—Cl<br>—CN<br>—OAc |
| Diene<br>$CH_2=\underset{}{\overset{R}{C}}-\underset{}{\overset{R'}{C}}=CH_2$ | —H<br>—Cl<br>—$CH_3$ | H<br>$CH_3$ |
| Acrylates<br>$CH_2=\underset{\underset{OR'}{\overset{\|}{C=O}}}{\overset{R}{C}}$ | —H<br>—$CH_3$ | Linear or branched alkyl groups<br>Alkyl groups containing functional groups such as amine, hydroxyl, carboxylic acid etc. |
| Acrylamides | —H | Linear or branched alkyl |

TABLE 1-continued

Structures of Various Vinyl Monomers

| Type of Vinyl Monomer | R | R' |
|---|---|---|
| $\underset{\underset{R'}{\overset{\|}{NH}}}{\overset{\|}{C=O}}$ | —$CH_3$ | groups<br>Alkyl groups containing functional groups such as amine, hydroxyl, carboxylic acid etc. |

In one embodiment, the core is composed of a homopolymer of polymethylmethacrylate (PMMA).

Figure 2:
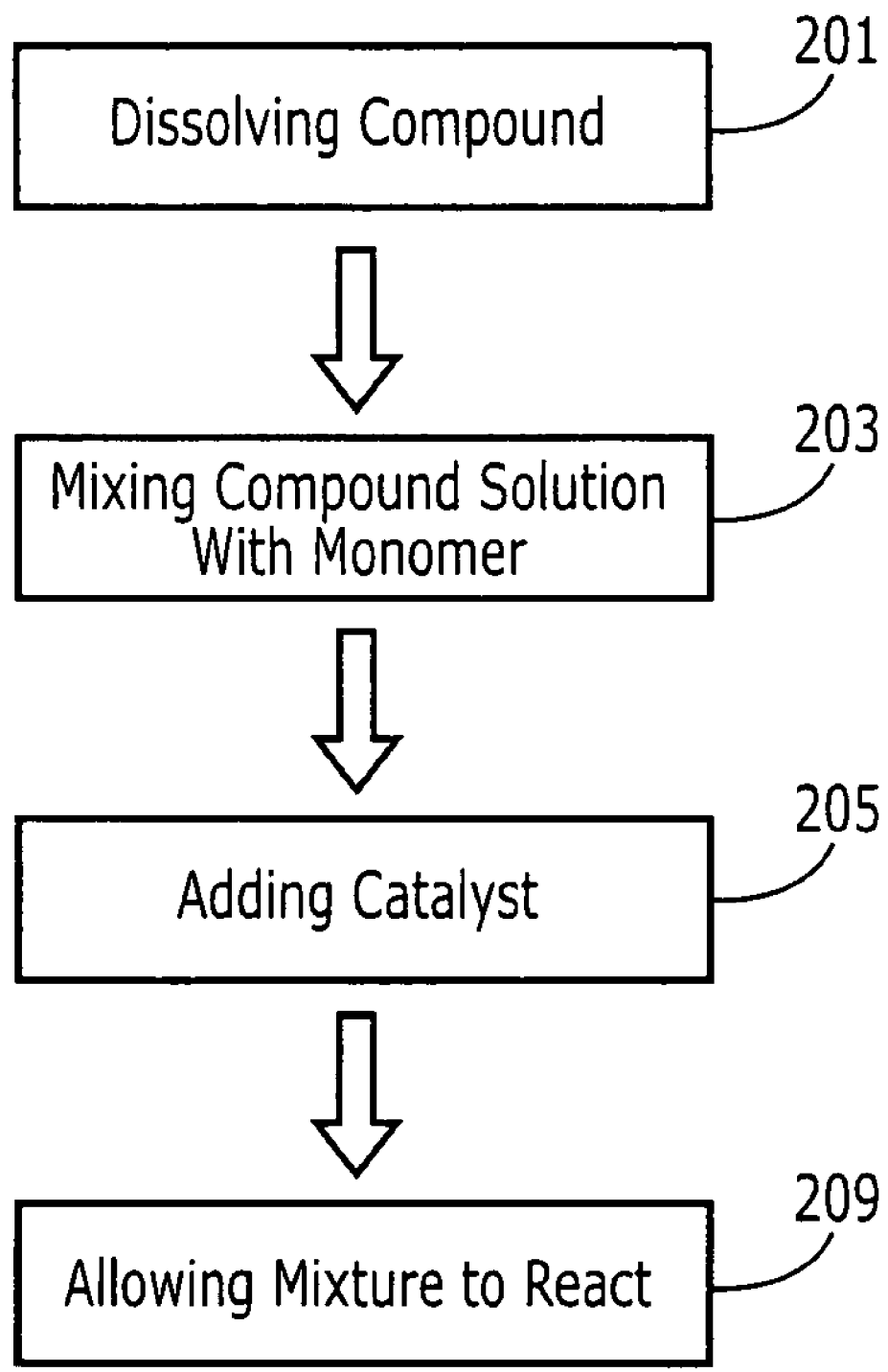
FIG. 2 shows the method of making the particle to be used with the present invention.

FIG. 2 is an embodiment of making the particle for use in the present method, wherein a nitrogen containing compound is dissolved in an aqueous medium 201, the resulting solution is mixed with a vinylic monomer 203 or a mixture of two or more monomers, a catalyst is added thereto 205, and the solution is allowed to react 209.

The nitrogen containing compound can be dissolved in an aqueous medium 201 such as water, acid or alkali, or other appropriate system chosen to suit the polymer or protein, such as having an appropriate pH and temperature. In one embodiment, polyethyleneimine is dissolved in de-ionized water. In another embodiment, chitosan is dissolved in 1% acetic acid.

The resulting solution can be mixed with a monomer or a mixture of monomers 205 in a weight ratio of monomer to nitrogen containing compound of 1:10 to 20:1, preferably 2:1 to 6:1. In one embodiment, there is 5 to 90 wt/wt % nitrogen containing compound, and 10 to 95 wt/wt % vinylic monomer.

Adding a catalyst 205 can include adding for example, alkyl peroxide, hydroperoxide, azo-initiators, persulfate, redox initiating system, and a metal based radical initiator.

Alkyl hydroperoxides (ROOH) such as t-butyl hydroperoxide (TBHP, t-BuOOH) and cumene hydroperoxide (CHP) are seldom used alone to initiate a polymerization reaction due to high decomposition temperature (half life time=0.44 h at 150° C., and 12 h at 120° C.). In addition, hydrogen of ROOH is susceptible to be abstracted by HO. or RO. radical to form peroxy radical, which is not sufficiently reactive to initiate the polymerization of monomer. Thus, alkyl hydroperoxides are poor initiators and need to be activated by other reagents. For example, cumene hydroperoxide has been extensively used with $Fe^{2+}$ in low temperature polymerization. Besides metal ion, low molecular weights of polyamines have also found to form redox pairs with alkyl hydroperoxides and activate their decomposition. For instance, TBHP/tetraethylene pentamine (TEPA) has been employed to prepare natural rubber/PMMA composite latexes. Although there are a few reports on amine-activated hydroperoxide initiation of vinyl monomer polymerization, no one has used a ROOH to induce the graft copolymerization of vinyl monomers directly onto a water-soluble, amine-containing polymer.

Alkyl hydroperoxides such as t-butyl hydroperoxide, cumene hydroperoxide, p-isopropyl cumene hydroperoxide, p-menthane hydroperoxide and pinane hydroperoxide are suitable initiating agents to induce the graft copolymerization of vinyl monomer onto the water-soluble polymers. Grafting percentage can be as high as 300% of the hydrophilic polymer backbone.

Radical initiators have been carefully investigated for the graft copolymerization of, for example, methyl methacrylate (MMA), a hydrophobic monomer. Results are listed in Table 2.

TABLE 2

Other Radical Initiators for the Graft Copolymerization of MMA

| Hydrophilic polymer | Initiators | Conc. [mM] | Conv. (%) | Grafting (%) | Effi. (%) | $D_n$ (nm) | $D_v/D_n$ |
|---|---|---|---|---|---|---|---|
| Casein | TBHP | 0.08 | 82 | 131 | 40 | 83 | 1.17 |
| | CHP | 0.08 | 81 | 113 | 35 | 71 | 1.24 |
| | KPS | 0.08 | 67 | 132 | 50 | 70 | 1.24 |
| | V-50 | 0.08 | 77 | 131 | 43 | 70 | 1.25 |
| | AIBN | 0.25 | 56 | | | | |
| | BPO | 0.25 | 7 | | | | |
| | TBP | 0.25 | 3 | | | | |
| PEI | TBHP | 0.08 | 96 | 187 | 47 | 132 | 1.12 |
| | KPS | 0.25 | 24 | — | — | — | |
| | V-50 | 0.25 | 91 | 59 | 16 | | |
| | TBHP/ TEPA | 10/1 0.2/0.2 | 99 77 | 0 4 | 0 1 | 89 121 | 1.17 1.09 |
| PVA | TBHP | 0.12 | 0 | | | | |

[a] Reaction conditions: 100 g of reaction mixture contains 95 g distilled water, 1 g water-soluble polymer, 4 g of purified MMA monomer and an appropriate concentration of initiator. Reaction took place at 80° for 2 h under $N_2$.
[b] $D_n$ and $D_v$ are number-average and volume-average diameter, respectively. $D_v/D_n$ is defined as the polydispersity index of particle size distribution.
[c] Casein was dissolved in 0.4 wt % sodium carbonate aqueous solution.

In one embodiment, the radical initiator TBHP is added to branched polyethylenimine. Results from such embodiment show that TBHP has advantages over other initiators in the presence of PEI.

The mole ratio of vinylic monomer to catalyst can be more than 1000:1. In one embodiment, the mole ratio is 5000:1.

The reaction might proceed at ambient temperature, but usually an elevated temperature is more effective, typically 30 to 95° C. In one embodiment, the reaction proceeds at a temperature of from 60 to 85° C. for a period of 1 to 8 hours under an appropriate atmosphere such as nitrogen.

The resultant particle from the method embodied in FIG. 2 is a water based core-shell latex nanoabsorbent particle, wherein the core is mainly composed of a polymer of a hydrophobic vinylic polymer and a grafted copolymer of the hydrophobic vinylic monomer, and the shell is mainly a hydrophilic, nitrogen-containing polymer. In one embodiment, the core can be composed of poly(methyl methacrylate) (PMMA) and a shell of polyethyleneimine. The resultant particles can have a size in the range of about 100 to 300 nm in diameter. This allows for a larger surface area available for adsorption when compared to the prior art, for example, silica particles. This hydrophobic core of the particle provides mechanical strength and allows interaction with organic matter, thus facilitating adsorption of organic compounds at the interface of core and shell. The hydrophilic shell can stabilize the particle through electrostatic and steric repulsion, as well as absorb heavy metals and organic contaminants through complexation, electrostatic interaction, and hydrogen bonding. The qualities and characteristics of the particles as made in accordance with the present method thus allow them to effectively absorb both organic and inorganic contamination from wastewater in an efficient manner. Further, the particles are capable of an absorption capacity of 2 to 4 times more than the granular products in the prior art.

FIG. 3 is an embodiment of the present method of treating leachate or other wastewaters, including the steps of mixing wastewater with fresh particles 303, separating the particles with the wastewater absorbed thereon 308, regenerating the particle 316, and mixing the regenerated particles with wastewater 327 in continuing the treatment process.

Mixing wastewater with fresh particles 303 is initiated by first obtaining wastewater 301, for example from leakage or runoff. In the case of leachate, the leachate can generally be obtained through the dissolution of contaminated water, which is obtained through the combination of organic and inorganic matter of solid waste mixed with rainwater. Leachate generally contains high concentration of various contaminants, including ammonia nitrogen compounds ($NH_3$—N), organic compounds, such as organic halogens, fatty acids, humic acids, and chloride compounds. Raw leachate can exhibit $NH_3$—N concentratiosn ranging from 2500-5000 mg/L. COD measurements can range from 5000 to 20000 mg/L. Ratio of BOD/COD can be less than 0.1. Leachate also can contain high concentrations of non-biodegradable compounds, such as heavy metals including lead $Pb(II)$, $Zn(II)$, $Cd(II)$, $Ni(II)$, $Cu(II)$, $Mn(II)$, $Co(II)$, $La(II)$, $Fe(II)$, $Sn(II)$, and $Ag(II)$. Leachate may be obtained by it being directed and collected in sewage systems, recirculation by collecting it at the bottom of the landfill and directing it to the top of the landfill, collecting the leachate for storage in tanks, etc.

Other wastewaters can be obtained through leakage or runoff, occurring from various industries including textile manufacturing; paper and paper products manufacturing; raw chemical materials and chemical products manufacturing; leather, fur, and feather products manufacturing; coal mining and coal washing; petroleum and natural gas extraction; ferrous metal ore mining and ferrous metal ore processing; non-metal ore mining, agricultural food processing; food manufacturing; beverage manufacturing; tobacco manufacturing; textile wearing apparel, footwear, and cap manufacturing; timber processing; wood, bamboo, rattan, palm and straw manufacturing; furniture manufacturing; media printing and reproduction; articles for culture, education and sport activity manufacturing; processing of petroleum; coking; processing of nuclear fuel; medicine manufacturing; chemical fiber manufacturing; rubber manufacturing; plastic manufacturing; non-metallic mineral product manufacturing; ferrous metal smelting and pressing; non-ferrous metal smelting and pressing; metal product manufacturing; general purpose machinery manufacturing; special purpose machinery manufacturing; transport equipment manufacturing; electrical machinery and equipment manufacturing; communication equipment, computer, and electronic equipment manufacturing; measuring instrument manufacturing; artwork manufacturing; waste disposal and recycling; electric power and heat power production and distribution; gas production and distribution; and water production and distribution.

In the present method, the wastewater is then mixed with particles, made in accordance with the method detailed in FIG. 2. Mixing can occur by adding raw particles to the raw wastewater. The ratio of particles to wastewater can be from 0.5 to 10 g/L, preferably 1 to 5 g/L. In one embodiment, the ratio is 4 g/L. At the batch reactor level, mixing can occur by stirring at a rate of about 50 to 500 rpm, preferably 150 to 300 rpm. In one embodiment, the rpm can be at 200 rpm for 15 minutes. Mixing may occur in a tank, such as a holding tank or treatment tank, or in flow, such as when wastewater may be directed to a particular location, for example, recirculation. Mixing may also occur by shaking, agitating, and other methods well known in the art.

As is known in the art, the speed of mixing, temperature, and time may be adjusted to meet the needs of scale-up that would be used to treat wastewater, such as large volumes of wastewater stored in tanks. Scaling up would be known to one with ordinary skill in the art to the efficiency required to effectively apply the invention.

As a result of mixing with particles, the contaminants in the wastewater are absorbed onto the particles 307. Adsorption occurs and is effective because of the amphiphilic nature of the core-shell particles and the large surface area of the particles, brought about by the near uniform size distribution developed through the manufacturing of the particles, and the functional nature of the particles. The hydrophobic core of the particle allows hydrophobic interaction between the particles and organic compounds in the wastewater, facilitating adsorption of the organic compound into the core of the particles or at the interface, whereas the hydrophilic shall effectively absorb the heavy metal compounds present in the wastewater through complex action, and absorb organic and inorganic contaminants via electrostatic interaction, and hydrogen bonding. Thusly, the particles are able to address both the inorganic and organic compounds present in wastewater.

The particles with absorbed contaminants are then separated from the treated wastewater, for example by centrifugation 308. In laboratory setting and batch runs, if centrifugation is used as the separation means, the centrifuge can run at a speed of from 4000 to 10000 rpm for a period of about 3 to 15 minutes. In one embodiment, the centrifuge speed can run at 8000 rpm for a period of 8 minutes. In another embodiment, the centrifuge speed can be 8000 rpm for a period of 5 minutes.

In one embodiment, supernatant liquid can be collected following centrifugation 308, the supernatant being spun off treated wastewater. The supernatant may be analyzed for COD and $NH_3$—N. This analysis is performed to study the progression of the removal or inorganic and organic compounds from the wastewater.

In another embodiment, water can be added to the treated particles 309 in an effort to wash the particles. Suitable types of water can include distilled water, de-ionized water, and double distilled water. Supernatant resulting from the washing can be removed. Removed supernatant can be analyzed for COD and $NH_3$—N. The treated particles may be washed more than once, preferably two to four times in an effort to remove unabsorbed contaminants from the particles. Washing with water, however, is not a necessary step for regeneration or treatment of the particles.

The particles may then be regenerated 316. Firstly, a solution can be added to the washed particles 317. The solution can be acidic, with a pH of between 1 to 6. In one embodiment, the pH is 2. Solutions suitable include HCl, $H_2SO_4$, $HNO_3$, and the like. Following the addition of the particles, the solution can be adjusted such that it remains at a pH below 7.

Regeneration occurs by mixing the particles in the acidic solution at a stirring speed between 200 and 1000 rpm for an appropriate time. In one embodiment, mixing occurs for 1 hour. Mixing can occur by centrifugation, bathing, soaking, agitating, shaking, and the like. The regenerated particles can be recovered by centrifuging the particles and washing with water for multiple times, preferably from 4 to 7 times. In one embodiment, regeneration by centrifuging occurs for 5 times. Through the entire regeneration step, the solution's pH is monitored to remain 6 or below.

Following regeneration 316, water is added to the regenerated particles 319 and the supernatant is removed 323. In one embodiment, the supernatant may be analyzed for COD and $NH_3$—N analysis.

The regenerated particles are then mixed with another wastewater batch 327.

The method of the present invention is capable of being performed multiples of times. This allows the treatment of wastewater, in particular leachate, to be performed at less expense and more efficiently. In one embodiment, the particles are regenerated for the treatment of wastewater or leachate at least 10 times. In another embodiment, the particles are regenerated 10 times. In yet another embodiment, the particles may be generated between 7 to 10 times.

EXAMPLE

The following example was used in batch setting, however it is within the knowledge of one with skill in the art to utilize the example and scale-up therefrom for efficiency and minimum production requirements.

Raw leachate containing various organic compounds such as oil and grease, and $NH_3$—N was obtained. The COD of the leachate measured 7316 mg/L, NH3—N measured 999 mg/L, and the BOD measured 530 mg/L.

To 200 ml of the leachate, raw particles consisting of PMMA (core), and PEI (shell) were added in a ratio of 4 g/L. The mixture was stirred at 150 rpm for 15 minutes at room temperature, then was centrifuged at 8000 rpm for 8 minutes to separate the particles and treated leachate. The treated leachate was collected for analysis of COD and $NH_3$—N. A volume of de-ionized water equal to the volume of leachate collected was mixed with the particles, and the mixture was centrifuged at 8000 rpm for 5 minutes. The de-ionized was decanated out. This process was repeated 4 more times in order to remove only unabsorbed leachate.

A solution of HCl at pH 2 was added to the particles. The solution was readjusted to maintain the pH at 2. The mixture was stirred in the range of 200-1000 rpm for 1 hour to completely release leachate complexed onto the particles. The regenerated particles were purified by repeated washing and centrifugation cycle 5 times. The regenerated particles were then obtained, and used for subsequent cycles of leachate treatement, i.e., adding the particles to 200 ml of new leachate.

The above experiment was also performed using particles made of PMMA (core) and Chitosan (Shell).

The particles were used for treatment and were regenerated for 10 times. FIG. 4 shows the removal efficiency of the particles with regards to COD, where through 11 cycles the particles maintained an efficiency of between 30 and 40%. FIG. 5 shows the removal efficiency of the particles with regards to $NH_3$—N removal, where through 11 cycles the particles maintained an efficiency of between 40 and 50%. FIG. 6 shows the regeneration efficiency of the particles following treatment of leachate for $NH_3$—N, where after 10 regenerations, the particles still possess an efficiency of between 80 to 90%. FIG. 7 shows the regeneration efficiency of the particles following treatment of leachate for COD, where after 10 regenerations, the particles still possess an efficiency of between 60 and 80%. FIG. 8 shows the microscopic comparison of fresh particles and particles following 10 regeneration cycles.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A method of treating inorganic and organic compounds in wastewater, comprising the steps of;
   mixing said wastewater with amphiphilic core-shell particles,
   separating said particles from said wastewater,
   regenerating said particles,
   mixing said regenerated particles with a subsequent batch of wastewater,
   wherein said method occurs for at least 10 subsequent times using said regenerated particles.

2. The method of claim 1, wherein mixing said wastewater with amphiphilic core-shell particles comprises the steps of obtaining wastewater, adding raw amiphiphilic core-shell particles to raw wastewater, and mixing.

3. The method of claim 1, wherein the adding said raw particles to said raw wastewater gives a ratio of particles to wasterwater of from 0.5 to 10 g/L.

4. The method of claim 1, wherein mixing wastewater with amphiphilic core-shell particles occurs at a rate of about 50 to 500 rpm.

5. The method of claim 1, wherein regenerating said particles comprises the steps of adding an acidic solution to said particles.

6. The method of claim 5, further comprising the step of washing said particles with water prior to adding said acidic solution.

7. The method of claim 5, wherein adding an acidic solution to said particles occurs subsequently more than once.

8. The method of claim 1, further comprising the steps of collecting supernatant, and testing said supernatant.

9. The method of claim 1, wherein said wastewater is derived from an industry, the industry selected from the group consisting of textile manufacturing, paper and paper products manufacturing, raw chemical materials and chemical products manufacturing, leather, fur, and feather products manufacturing, coal mining and coal washing, petroleum and natural gas extraction, ferrous metal ore mining and ferrous metal ore processing, non-metal ore mining, agricultural food processing, food manufacturing, beverage manufacturing, tobacco manufacturing, textile wearing apparel, footware, and cap manufacturing, timber processing, wood, bamboo, rattan, palm and straw manufacturing, furniture manufacturing, media printing and reproduction, articles for culture, education and sport activity manufacturing, processing of petroleum, coking, processing of nuclear fuel, medicine manufacturing, chemical fiber manufacturing, rubber manufacturing, plastic manufacturing, non-metallic mineral product manufacturing, ferrous metal smelting and pressing, non-ferrous metal smelting and pressing, metal product manufacturing, general purpose machinery manufacturing, special purpose machinery manufacturing, transport equipment manufacturing, electrical machinery and equipment manufacturing, communication equipment, computer, and electronic equipment manufacturing, measuring instrument manufacturing, artwork manufacturing, waste disposal and recycling, electric power and heat power production and distribution, gas production and distribution, and water production and distribution.

10. The method of claim 1, wherein said amphiphilic core-shell is comprised of a shell made from a hydrophilic, nitrogen containing compound and a core made of a graft homopolymer and poly(methyl methacrylate).

11. The method of claim 10, wherein said shell is selected from the group consisting of polyethyleneimine and chitosan.

12. A method of treating inorganic and organic compounds in leachate, comprising the steps of;
    mixing said leachate with amphiphilic core-shell particles containing a shell containing an amine-containing water soluble polymer and a core containing a hydrophobic polymer,
    separating said particles with said leachate,
    regenerating said particles,
    mixing said regenerated particles with a subsequent batch of leachate,
    wherein said method occurs for at least 10 subsequent times using said regenerated particles.

13. The method of claim 12, wherein said hydrophobic polymer is poly(methyl methacrylate).

14. The method of claim 12, wherein mixing said leachate with said particles comprises the steps of obtaining leachate, adding raw amphiphilic core-shell particles to raw leachate, and mixing.

15. The method of claim 13, wherein adding said raw particles to said raw leachate gives a particle to leachate ratio of 0.5 to 10 g/L.

16. The method of claim 12, wherein regenerating said particles comprises the steps of adding a solution with a pH between 1 and 6 to said particles.

17. The method of claim 16, further comprising the step of washing said particles with water prior to adding said solution.

* * * * *